(12) United States Patent
Huang et al.

(10) Patent No.: US 11,982,578 B2
(45) Date of Patent: May 14, 2024

(54) TEMPERATURE DETECTION SYSTEM, TEMPERATURE DETECTION DEVICE AND CHARGING DEVICE THEREOF

(71) Applicant: Shenzhen chuangxinlian Electronics Co., Ltd, Shenzhen (CN)

(72) Inventors: Hong Huang, Shenzhen (CN); Bin Peng, Hunan Province (CN)

(73) Assignee: Shenzhen chuangxinlian Electronics Co., Ltd, Shenzhen (CN)

( * ) Notice: Subject to any disclaimer, the term of this patent is extended or adjusted under 35 U.S.C. 154(b) by 456 days.

(21) Appl. No.: 17/367,433

(22) Filed: Jul. 5, 2021

(65) Prior Publication Data

US 2022/0381621 A1    Dec. 1, 2022

(30) Foreign Application Priority Data

May 31, 2021   (CN) .......................... 202110603649.2

(51) Int. Cl.
*G01K 7/02*   (2021.01)
*G01K 7/18*   (2006.01)
(Continued)

(52) U.S. Cl.
CPC .............. *G01K 7/021* (2013.01); *G01K 7/18* (2013.01); *G01K 7/42* (2013.01); *G01K 1/024* (2013.01); *G01K 1/028* (2013.01); *G01K 1/14* (2013.01); *G01K 7/24* (2013.01); *G01K 7/25* (2013.01); *G01K 2207/06* (2013.01);
(Continued)

(58) Field of Classification Search
CPC ............ G01K 7/021; G01K 7/18; G01K 7/42; G01K 1/024; G01K 1/028; G01K 1/14; G01K 7/24; G01K 7/25; G01K 2207/06; G01K 2215/00; H02J 7/0047; H02J 7/345; Y02D 30/70
See application file for complete search history.

(56) References Cited

U.S. PATENT DOCUMENTS

3,942,123 A * 3/1976 Georgi ................... G01K 13/20
377/16
4,050,309 A * 9/1977 Junkert .................... G01K 7/21
374/173
(Continued)

*Primary Examiner* — Nathaniel T Woodward
*Assistant Examiner* — Philip L Cotey (57) ABSTRACT

The present disclosure provides a temperature detection system arranged in a temperature detection device, and a charging device thereof. The temperature detection system includes a power supply, a Bluetooth chip configured to detect a temperature of an object to be measured, output detection pulses and including a thermistor module that is configured to detect an ambient temperature of the object to be measured to obtain an intermediate temperature value, and a pulse temperature sensor arranged around the Bluetooth chip. The Bluetooth chip is configured to receive the detection pulses, determine a final temperature value according to the intermediate temperature value and number of the detection pulses per unit time, and convert the final temperature value into Bluetooth signals to output. The present disclosure can ensure detection redundancy and improve detection accuracy, by providing two temperature detections to calculate the final temperature value according to a preset software program.

16 Claims, 7 Drawing Sheets

(51) Int. Cl.
  *G01K 7/42* (2006.01)
  *G01K 1/02* (2021.01)
  *G01K 1/024* (2021.01)
  *G01K 1/14* (2021.01)
  *G01K 7/24* (2006.01)
  *G01K 7/25* (2006.01)
  *H02J 7/00* (2006.01)
  *H02J 7/34* (2006.01)

(52) U.S. Cl.
  CPC ........ *G01K 2215/00* (2013.01); *H02J 7/0047* (2013.01); *H02J 7/345* (2013.01); *Y02D 30/70* (2020.08)

(56) References Cited

U.S. PATENT DOCUMENTS

| | | | |
|---|---|---|---|
| 10,139,859 B2* | 11/2018 | von Badinski | G06V 40/10 |
| 2015/0220109 A1* | 8/2015 | von Badinski | H02S 99/00 |
| | | | 368/10 |
| 2017/0223780 A1* | 8/2017 | Heo | H05B 6/1209 |
| 2021/0037813 A1* | 2/2021 | Scalea | G06Q 10/0832 |
| 2021/0114036 A1* | 4/2021 | Wang | B01L 3/50851 |
| 2021/0231503 A1* | 7/2021 | Wu | G01K 1/024 |
| 2021/0356328 A1* | 11/2021 | Ferraro | G01K 7/42 |
| 2022/0333997 A1* | 10/2022 | Newhouse | G01K 1/024 |

* cited by examiner

TEMPERATURE DETECTION SYSTEM, TEMPERATURE DETECTION DEVICE AND CHARGING DEVICE THEREOF

CROSS-REFERENCE TO RELATED APPLICATION

This application claims priority to Chinese Patent Application No. 202110603649.2, entitled "LOW-POWER DIGITAL SMART FOOD THERMOMETER" and filed on May 31, 2021, the content of which is hereby incorporated by reference in its entirety.

BACKGROUND

Technical Field

The present disclosure generally relates to a technical field of temperature detection technology, and especially relates to a temperature detection system, a temperature detection device and a charging device thereof.

Description of Related Art

In the field of temperature detection, mature technology and high detection accuracy are occurred for temperature detection, product temperature detection and other fields.

However, there are higher requirements for the temperature detection of cooking food, for example, conveniently detecting temperatures of the food. When cooking food, how to conveniently and quickly obtain a center temperature of the food, and update data in real time, so as to guide the way of cooking is very important. Another example is accuracy of the temperature detection: different cooking temperatures for different ingredients are required during cooking the food, and critical temperatures are also different during changing cooking states, in order to prevent taste of the food from being affected by the inaccuracy of the temperature detection. Also, such as heat resistances: how to ensure the thermal resistance of structures and internal circuits of a temperature detection device for the temperature detection so as to prevent that a failure of the temperature detection is occurred, is also important. Requirements of low-power consumption are also important: how to achieve long-time standby work and in a sleep state during non-work so as to achieve energy saving is also a problem to be solved.

The present disclosure is configured to solve the technical problem of the temperature detection of the food.

SUMMARY

The technical problems to be solved: in view of the shortcomings of the related art, the present disclosure relates to a temperature detection system, a temperature detection device and a charging device thereof, which can not only ensure detection redundancy, but also improve detection accuracy through providing two temperature detections.

A temperature detection system according to an embodiment of the present disclosure includes: a power supply configured to supply power to the temperature detection system; a pulse temperature sensor configured to detect a temperature of an object to be measured by inserting into the object to be measured, and output detection pulses; a Bluetooth chip electrically connected to the power supply and the pulse temperature sensor, and configured to receive the detection pulses transmitted from the pulse temperature sensor and calculate number of the detection pulses per unit time, the Bluetooth chip including: a negative temperature coefficient (NTC) thermistor module configured to detect an ambient temperature of the object to be measured to obtain an intermediate temperature value; an one-time programmable (OTP) memory configured to store software programs in the Bluetooth chip, and the Bluetooth chip configured to determine a final temperature value according to the intermediate temperature value and the number of the detection pulses per unit time by performing the software programs; a Bluetooth output module configured to convert the detected final temperature value into Bluetooth radio frequency (RF) signals and then output the Bluetooth radio frequency signals; and wherein the final temperature value is obtained through the followings: calculating a first temperature value through formula (1-1) according to the number of the detection pulses per unit time sent from the pulse temperature sensor; Temp=Num*0.0625° C.−50.0625° C. (1-1); wherein, Num represents the number of the detection pulses, Temp represents the first temperature value; and comparing the first temperature value with the intermediate temperature value, to take a larger one from the first temperature value and the intermediate temperature value as the final temperature value.

Wherein the Bluetooth output module includes: a radio frequency (RF) module configured to transmit a temperature value signal conforming to a Bluetooth communication protocol according to the final temperature value; a radio frequency (RF) antenna; and a radio frequency (RF) matching circuit electrically connected between the RF module and the RF antenna, and configured to perform up-conversion on the temperature value signal of the RF module, and then send the up-conversion temperature value signal to the RF antenna; and the RF antenna configured to convert the temperature value signal transmitted from the RF matching circuit into a Bluetooth radio frequency signal with good stability and directivity, and then send out the Bluetooth radio frequency signal in a radio form.

Wherein the final temperature value is calculated by the following correction process: calculating a second temperature value through formula (2-1) according to the number of the detection pulses per unit time sent from the pulse temperature sensor;

$$T=\text{Temp}+(\text{Temp}-30)*0.005, \text{Temp}<30° \text{C.};$$

$$T=\text{Temp}, 30° \text{C.} \le \text{Temp}<100° \text{C.};$$

$$T=\text{Temp}+(100-\text{Temp})*0.012, 100° \text{C.} \le \text{Temp}<150° \text{C.}; \quad (2\text{-}1)$$

wherein, T represents the second temperature value, Temp represents the first temperature value; and comparing the second temperature value with the intermediate temperature value, to take a larger one from the second temperature value and the intermediate temperature value as the final temperature value.

Wherein the Bluetooth chip includes a low-power management module configured to control the power supply to supply power to the Bluetooth chip.

Wherein the temperature detection system further includes: a charging circuit electrically connected with the power supply and configured to charge the power supply; and a low dropout regulator (LDO) electrically connected between the power supply and the Bluetooth chip, and configured to stabilize electrical parameters of the power supply and supply power to the Bluetooth chip and the pulse temperature sensor.

Wherein the temperature detection system further includes a charge and discharge protection circuit electrically connected with the charging circuit and the power supply, the low dropout regulator electrically connected between the charge and discharge protection circuit and the Bluetooth chip, the charge and discharge protection circuit configured to intelligently manage the charging circuit to charge the power supply and indicate a charging state of the power supply.

Wherein the Bluetooth chip adopts DA14531 series of Bluetooth chips produced by US Dialog Company.

Wherein the temperature detection system is further electrically connected to an intelligent terminal, the intelligent terminal communicated with the Bluetooth chip to receive the final temperature value detected by the Bluetooth chip.

A temperature detection device according to an embodiment of the present disclosure includes: a temperature detection system including a charging circuit and configured to detect a final temperature value of an object to be measured; a long-strip shaped main body including a first portion and a second portion opposite to the first portion, the first portion configured to detect a temperature of the object to be measured by inserting into the object to be measured, and the second portion exposed outside the object to be measured and sending out the final temperature value detected by the temperature detection system; a circuit structure arranged in the main body, and carrying the temperature detection system thereon; a pair of charging terminals respectively arranged in the main body, extending out of the main body, and electrically connected to the charging circuit; and wherein the temperature detection system includes: a power supply configured to supply power to the temperature detection system; a pulse temperature sensor configured to detect a temperature of the object to be measured by inserting into the object to be measured, and output detection pulses; a Bluetooth chip electrically connected to the power supply and the pulse temperature sensor and configured to receive the detection pulses transmitted from the pulse temperature sensor and calculate number of the detection pulses per unit time, the Bluetooth chip including: a negative temperature coefficient (NTC) thermistor module configured to detect an ambient temperature of the object to be measured to obtain an intermediate temperature value; an one-time programmable (OTP) memory configured to store software programs in the Bluetooth chip, and the Bluetooth chip configured to determine the final temperature value according to the intermediate temperature value and the number of the detection pulses per unit time by performing the software programs; a Bluetooth output module configured to convert the detected final temperature value into Bluetooth radio frequency (RF) signals and then output the Bluetooth radio frequency signals; and wherein the final temperature value is obtained through the followings: calculating a first temperature value through formula (1-1) according to the number of the detection pulses per unit time sent from the pulse temperature sensor; Temp=Num*0.0625° C.−50.0625° C. (1-1); wherein, Num represents the number of the detection pulses, Temp represents the first temperature value; and comparing the first temperature value with the intermediate temperature value, to take a larger one from the first temperature value and the intermediate temperature value as the final temperature value.

Wherein the pair of charging terminals includes a first terminal including two metal contacts respectively arranged on both sides of the main body along a transverse direction of the main body, and a second terminal arranged on an end of the second portion.

Wherein the circuit structure includes: a circuit board that the power supply, the thermistor module and the pulse temperature sensor are respectively arranged on the circuit board and near the first portion; the Bluetooth output module arranged on the circuit board and near the second portion, and electrically connected to the second terminal; an RF antenna of the Bluetooth output module electrically connected with the first terminal through a coaxial signal wire of the circuit board, and the power supply electrically connected between the first terminal and the second terminal.

Wherein the Bluetooth chip is arranged on the circuit board, near the first portion, and electrically connected with the coaxial signal wire of the circuit board; the coaxial signal wire including an isolation magnetic bead configured to isolate the Bluetooth radio frequency signals on the coaxial signal wire from charging signals output from the charging circuit, so that the charging signals and the Bluetooth radio frequency signals share with the same channel.

Wherein each of the pair of charging terminals is a telescopic thimble structure.

Wherein the main body is made of antibacterial and heat-resistant metal material.

Wherein a high temperature resistant gel shell sleeves around the second portion, and the pair of charging terminals extends out of the gel shell.

A charging device configured to charge a temperature detection device according to an embodiment of the present disclosure is provided. The temperature detection device includes: a temperature detection system configured to detect a final temperature value of an object to be measured; a long-strip shaped main body including a first portion and a second portion opposite to the first portion, the first portion configured to detect a temperature of the object to be measured by inserting into the object to be measured, and the second portion exposed outside the object to be measured and sending out the final temperature value detected by the temperature detection system; a circuit structure arranged in the main body, and carrying the temperature detection system thereon; a pair of charging terminals respectively arranged in the main body, extending out of the main body, and electrically connected to the charging circuit; and wherein the temperature detection system includes: a power supply configured to supply power to the temperature detection system; a pulse temperature sensor configured to detect the temperature of the object to be measured by inserting into the object to be measured, and output detection pulses; a Bluetooth chip electrically connected to the power supply and the pulse temperature sensor and configured to receive the detection pulses transmitted from the pulse temperature sensor and calculate number of the detection pulses per unit time, the Bluetooth chip including: a negative temperature coefficient (NTC) thermistor module configured to detect an ambient temperature of the object to be measured to obtain an intermediate temperature value; an one-time programmable (OTP) memory configured to store software programs in the Bluetooth chip, and the Bluetooth chip configured to determine the final temperature value according to the intermediate temperature value and the number of the detection pulses per unit time by performing the software programs; a Bluetooth output module configured to convert the detected final temperature value into Bluetooth radio frequency (RF) signals and then output the Bluetooth radio frequency signals; and wherein the final temperature value is obtained through the followings: calculating a first temperature value through formula (1-1) according to the number of the detection pulses per unit time sent from the pulse temperature sensor; Temp=Num*0.0625° C.−50.0625° C. (1-1); wherein, Num represents the number of the detection pulses, Temp represents the first temperature value; and comparing the first temperature value with the intermediate temperature value, to take a larger one from the first temperature value and the intermediate temperature value as the final temperature value; and wherein the charging device includes: a charging chamber; a receiving room arranged in the charging chamber for receiving the temperature detection device therein, a pair of charging contacts arranged on a side wall of the receiving room to electrically connect with the pair of charging terminals, respectively; a charging circuit arranged in the charging chamber so that the pair of charging contacts is electrically connected with the pair of charging terminals through the charging circuit to charge the temperature detection device.

Wherein the charging circuit includes a charging interface arranged at one end of the charging chamber, and an indicating light located on the charging chamber for indicating a charging state of the temperature detection device.

Firstly, the charging device and the temperature detection device of the present disclosure are used in combination. Specifically, the temperature detection device placed in the charging device is charged or standby when the temperature detection device is not used, while, the temperature detection device can be removed from the charging device and then be inserted into the food to detect the temperature of the food when needing to use the temperature detection device, which can ensure sufficient power of the temperature detection device to the maximum extent. Furthermore, the low-power management module is provided in the temperature detection system of the present disclosure for supplying power to the Bluetooth chip to intelligently control the Bluetooth chip to stand by and wake up, so as to realize energy guarantee and stand-by to the maximum extent.

Secondly, the thermistor module is provided in the Bluetooth chip and configured to detect the ambient temperature of the object to be measured to obtain the intermediate temperature value; at the same time, the pulse temperature sensor is arranged around the Bluetooth chip and configured to detect the temperature of the object to be measured so as to obtain the first temperature value, and then process the intermediate temperature value and the first detection temperature by the software program to obtain the final temperature, which can ensure detection redundancy and improve detection accuracy, by two temperature detections to calculate the final temperature value according to a preset software program.

Thirdly, the long-strip shaped main body is provided in the temperature detection device of the present disclosure, and the main body includes the first portion and the second portion opposite to the first portion, the first portion configured to detect the temperature of the object to be measured by inserting into the object to be measured, and the second portion exposed outside the object to be measured and sending out the final temperature value detected by the temperature detection system. In this way, even if the food is cooking, a center temperature of the food can be detected in real time, and then send the center temperature of the food through a Bluetooth, so as to conveniently monitor the temperature of the food in real time.

Finally, the high temperature resistant gel shell sleeves around the main body so that the temperature detection device of the present disclosure can continue to detect the temperature of the food during cooking the food, rather than affecting the detection function due to high temperatures and damaging the temperature detection device.

DETAILED DESCRIPTION

The present disclosure is further described in detail in conjunction with embodiments and accompanying drawings below.

Figure 1:
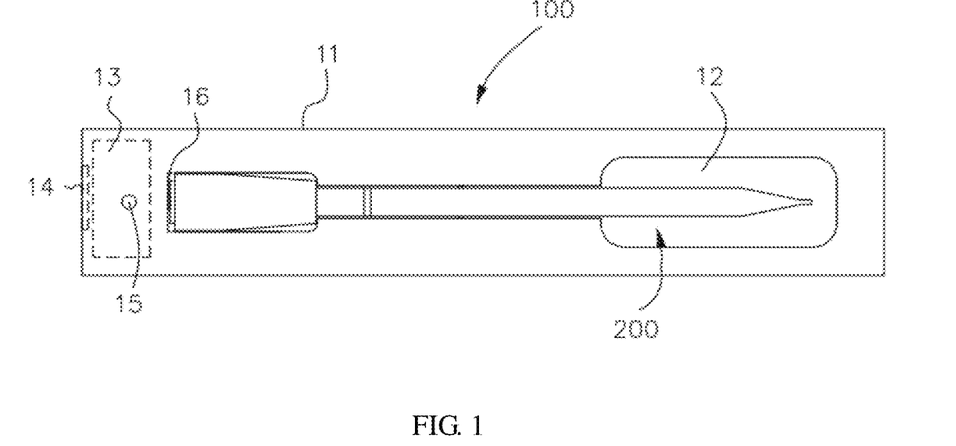
FIG. 1 is a schematic view of a temperature detection device placed in a corresponding charging device in accordance with an embodiment of the present disclosure.
Figure 2:
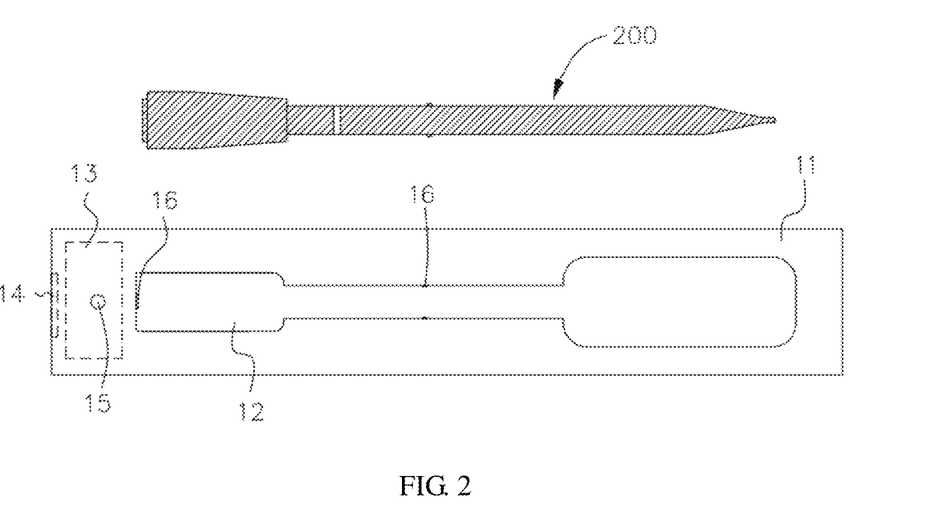
FIG. 2 is an exploded, schematic view of the temperature detection device and the charging device of FIG. 1.

Referring to FIG. 1 and FIG. 2, a charging device 100 applied to charge a temperature detection device 200 according to an embodiment of the present disclosure is provided. The charging device 100 includes: a charging chamber 11, a receiving room 12 and a charging circuit 13. The receiving room 12 is arranged in the charging chamber 11 for receiving the temperature detection device 200 therein, and a pair of charging contacts 16 is arranged on a side wall of the receiving room 12 to electrically connect with a pair of charging terminals 23 of the temperature detection device 200, respectively. The charging circuit 13 is arranged in the charging chamber 11 so that the pair of charging contacts 16 is electrically connected with the pair of charging terminals 13, respectively.

The charging device 100 and the temperature detection device 200 of the present disclosure are used in combination. Specifically, the temperature detection device 200 placed in the charging device 100 is charged or standby when the temperature detection device 200 is not used, while, the temperature detection device 200 can be removed from the charging device 100 and then be inserted into the food to detect a temperature of the food when needing to use the temperature detection device 200, which can ensure sufficient power of the temperature detection device to the maximum extent.

Furthermore, the charging circuit 13 includes a charging interface 14 arranged at one end of the charging chamber 11, and an indicating light 15 located on a surface of the charging chamber 11 for indicating a charging state of the temperature detection device 200.

Figure 3:
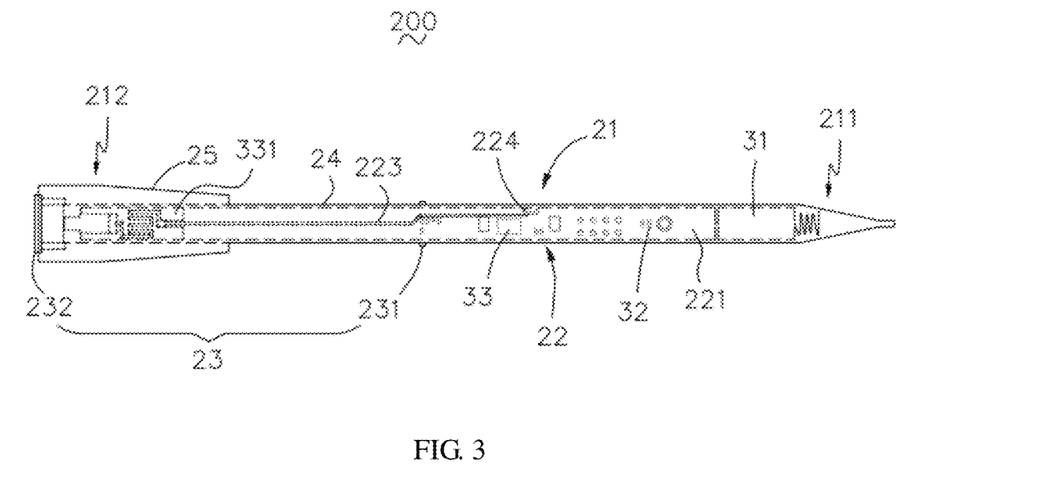
FIG. 3 is a schematic view of the temperature detection device of FIG. 1.

Referring to FIG. 3, the temperature detection device 200 includes: a main body 21, a circuit structure 22 and the pair of charging terminals 23. Specifically, the main body 21 is a long-strip shaped configuration and includes a first portion 211 and a second portion 212 opposite to the first portion 211. The first portion 211 is configured to detect a temperature of the object to be measured by inserting into the object to be measured, and the second portion 212 is exposed outside the object to be measured and sending out a final temperature value of the object to be measured detected by the temperature detection device 200. The circuit structure 22 is received in the main body 21 and configured to carry a temperature detection system 300 thereon, and the temperature detection system 300 is within the temperature detection device 200 and configured to detect the final temperature value of the object to be measured, such as cooking food. The pair of charging terminals 23 is respectively arranged in the main body 21 and extends out of the main body 21, and electrically connected to the charging circuit 13 within the temperature detection system 300.

In an embodiment of the present disclosure, the pair of charging terminals 23 includes a first terminal 231 and a second terminal 232. The first terminal 231 includes two metal contacts A respectively arranged on both sides of the main body 21 along a transverse direction of the main body 21, and the second terminal 232 is arranged on an end B of the second portion 212. When the temperature detection device 200 is received in the charging device 100, the first terminal 231 and the second terminal 232 are respectively connected with the pair of charging contacts 16 for charging the circuit structure 22.

Furthermore, each of the pair of charging terminals 23 is a telescopic thimble structure, and the main body 21 is made of antibacterial and heat-resistant metal material 24. A high temperature resistant gel shell 25 sleeves around the second portion 212, and the pair of charging terminals 23 extends out of the gel shell 25.

Furthermore, by setting each of the pair of charging terminals 23 as a thimble structure, when the temperature detection device 200 is placed in the charging device 100, not only the pair of charging terminals 23 is closely in contact with the pair of charging contacts 16, but also the temperature detection device 200 can be better fixed on the charging device 100 through retractable elasticity of the pair of charging terminals 23.

In the present disclosure, the main body 21 is a long-strip shaped configuration and includes the first portion 211 and the second portion 212. The first portion 211 is configured to detect the temperature of the object to be measured by inserting into the object to be measured, and the second portion 212 is exposed outside the object to be measured and sending out the final temperature value of the object to be measured detected by the temperature detection device 200. In this way, even if the food is cooking, a center temperature of the food can be detected in real time, and then send the center temperature of the food through a Bluetooth, so as to conveniently monitor the temperature of the food in real time.

In the present disclosure, the antibacterial and heat-resistant metal material 24 and the high temperature resistant gel shell 25 sleeve around the main body 21 so that the temperature detection device 200 can continue to detect the temperature of the food during cooking the food, rather than affecting the detection function due to high temperatures and damaging the temperature detection device 200.

Figure 4:
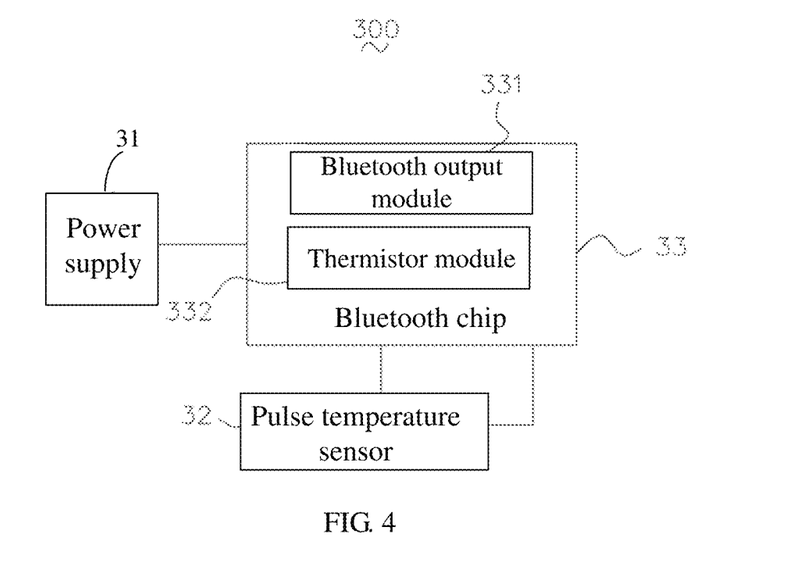
FIG. 4 is a diagram view of a temperature detection system of the temperature detection device of FIG. 1.

Referring to FIG. 4, the temperature detection system 300 includes: a power supply 31, a pulse temperature sensor 32 and a Bluetooth chip 33. The power supply 31 is configured to supply power to the temperature detection system 300; the pulse temperature sensor 32 is configured to detect a temperature of the object to be measured by inserting into the object to be measured, and output detection pulses; the Bluetooth chip 33 is electrically connected to the power supply 31 and the pulse temperature sensor 32, and configured to receive the detection pulses transmitted from the pulse temperature sensor 32 and calculate number of the detection pulses per unit time according to the detection pulses, so as to prepare for detecting the final temperature value, and convert the detected final temperature value into Bluetooth signals and then output the Bluetooth signals.

In an embodiment of the present disclosure, the Bluetooth chip 33 includes: a Bluetooth output module 331, a thermistor module 332 and a one-time programmable memory 333.

The Bluetooth output module 331 is configured to convert the detected final temperature value into the Bluetooth radio frequency (RF) signals and then output the Bluetooth radio frequency (RF) signals. The thermistor module 332 is configured to detect an ambient temperature of the object to be measured to obtain an intermediate temperature value so that the Bluetooth chip 33 is configured to determine the detected final temperature value, according to the intermediate temperature and the number of the detection pulses per unit time.

The one-time programmable memory 333 is configured to store software programs in the Bluetooth chip 33, and the Bluetooth chip 33 configured to determine the final temperature value according to the intermediate temperature value and the number of the detection pulses per unit time by performing the software programs.

In the present disclosure, the thermistor module 332 is configured to detect the ambient temperature of the object to be measured to obtain the intermediate temperature value; at the same time, the pulse temperature sensor 32 additionally arranged on the periphery of the Bluetooth chip 33 is configured to detect the temperature of the object to be measured so as to obtain a first temperature value, and then, the Bluetooth chip 33 is configured to process the intermediate temperature value and the first temperature value to obtain the final temperature value, according to a calculation method recorded in the software programs, which can ensure detection redundancy and improve detection accuracy, by two temperature detections to calculate the final temperature value.

Specifically, the final temperature value is obtained through the followings:

A, calculating the first temperature value through formula (1-1) according to the number of the detection pulses per unit time sent from the pulse temperature sensor 32;

$$\text{Temp} = \text{Num} * 0.0625° \text{ C.} - 50.0625° \text{ C.} \tag{1-1}$$

wherein, Num represents the number of the detection pulses, Temp represents the first temperature value;

B, comparing the first temperature value with the intermediate temperature value, to take a larger one from the first temperature value and the intermediate temperature value as the final temperature value.

In an embodiment of the present disclosure, constants 0.0625 and 50.0625 are the best constants verified by experiments, which can achieve high precision temperature detection within a commonly cooking temperature range of −50° to 150°, detection accuracy can be as follows:
−20° C.~85° C. (within ±0.5° C.).;
−50° C.~−20° C. (within ±0.75° C.).;
85° C.~150° C. (within ±0.75° C.).;

In an embodiment of the present disclosure, the temperature detection system 300 is simpler, more digital and more accurate, which can achieve high-precision measurement without system calibration or hardware or software compensation.

In the present disclosure, the Bluetooth chip 33 can obtain the final detection temperature value, only the pulse temperature sensor 32 outputs the detection pulses according to the first temperature value. The detection pulse is a kind of signal wave controlled by a voltage, which has nothing to do with a current, in this way, the detection pulse with a minimal current can be set through a peripheral circuit, so that the pulse temperature sensor 32 can work under a low-current state. According to a heat formula of square positive correlation between a power and a current, heat can be reduced as much as possible to prepare for low-power consumption of the whole product.

In another embodiment of the present disclosure, a correction formula can also be used to segment compensate the detection temperature value so as to achieve higher precision temperature detection.

Specifically, the final temperature value is calculated by the following correction process:

calculating a second temperature value through formula (2-1) according to the number of the detection pulses per unit time sent from the pulse temperature sensor 32;

$$T=\text{Temp}+(\text{Temp}-30)*0.005, \text{Temp}<30° \text{ C.};$$

$$T=\text{Temp}, 30° \text{ C.} \leq \text{Temp} \leq 100° \text{ C.};$$

$$T=\text{Temp}+(100-\text{Temp})*0.012, 100° \text{ C.} \leq \text{Temp}<150° \text{ C.}; \quad (2\text{-}1)$$

wherein, T represents the second temperature value, Temp represents the first temperature value; and comparing the second temperature value with the intermediate temperature value, to take a larger one from the second temperature value and the intermediate temperature value as the final temperature value.

When the correction formula is used for performing subsection compensation calculation, a function segment corresponding to the first temperature value is determined according to the calculated first temperature value Temp, the second temperature value T can be calculated by using different correction formula functions, according to different function segments, and then the second temperature value T is compared with the intermediate temperature value, so as to take the larger one from the second temperature value T and the intermediate temperature value, as the final temperature value.

Referring to FIG. 3 and FIG. 4, in order to further reduce a cost and energy consumption of the product, the coaxial signal wire 223 is set in the circuit structure 22 so that the coaxial signal wire 223 is shared by charging signals for charging the temperature detection device 200 and Bluetooth RF signals for transmitting the Bluetooth signals.

The circuit structure 22 includes: a circuit board 221 that the power supply 31, the thermistor module 332 and the pulse temperature sensor 32 are respectively arranged on the circuit board 221 and near the first portion 211. The Bluetooth output module 331 is arranged on the circuit board 221 and near the second portion 212.

The Bluetooth output module 331 is electrically connected to the second terminal 232, a radio frequency (RF) antenna 3313 of the Bluetooth output module 331 is electrically connected with the first terminal 231 through the coaxial signal wire 223 of the circuit board 221, and the power supply 31 is electrically connected between the first terminal 231 and the second terminal 232.

Furthermore, the Bluetooth chip 33 is arranged on the circuit board 221, near the first portion 211, and electrically connected with the coaxial signal wire 223 of the circuit board 221. The coaxial signal wire 223 includes an isolation magnetic bead 224 configured to isolate the Bluetooth radio frequency signals of the coaxial signal wire 223 from the charging signals output from the charging circuit 13, so that the charging signals and the Bluetooth radio frequency signals share with the same channel.

Figure 5:
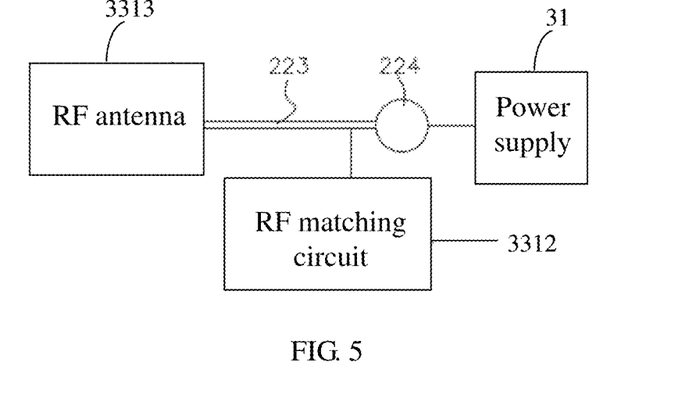
FIG. 5 is a schematic view of an isolation magnetic bead connected with a power supply, a radio frequency (RF) antenna and a radio frequency (RF) matching circuit.

In the present disclosure, the isolation magnetic bead 224 is a kind of component that can pass through a low-frequency electrical signal, rather than passing through a high-frequency electrical signal, when the coaxial signal wire 223 transmits the charging signal, the charging signal can be transmitted to the power supply 31 through the isolation magnetic bead 224, while, when the RF antenna 3313 transmits the Bluetooth RF signal with high frequency, the Bluetooth RF signal can't pass through the isolation magnetic bead 224. So, in a preferred embodiment, a front end of the isolation magnetic bead 224 is connected with the RF antenna 3313 so as to transmit the high-frequency Bluetooth signal, while, an opposite back end of the isolation bead 224 is connected with the power supply 31 to ensure that the coaxial signal wire 223 can still charge the power supply 31 during transmitting the high-frequency Bluetooth signal, as shown in FIG. 5.

In the present disclosure, the RF antenna 3313 is arranged on the second portion 212 of the circuit board 221, and configured to send the high-frequency signal, and then convert the high-frequency signal into the Bluetooth RF signal for external transmission. The high-frequency signal works under a high power condition, which will lead to a high temperature of the second portion 212. All of the power supply 31, the thermistor module 332 and the pulse temperature sensor 32 are arranged near the first portion 211 so that a distance between the Bluetooth chip 33 and the RF antenna 3313 is too large. In order to avoid a high-frequency signal interference caused by increased circuits, resulting in heat generation of increased circuits, the circuit board 221 is designed by a four-layer configuration and provides the coaxial signal wire 223, therefore, 50 ohm impedance is used for signal transmission to reduce circuit instability caused by artificially matching electronic elements.

More specifically, electrical signals processed by the power supply 31, the thermistor module 332 and the pulse temperature sensor 32 arranged on the circuit board 221 near the first portion 211 are all low frequency signals, and the signals transmitted by the RF antenna 3313 are high frequency signals. The power supply 31, the thermistor module 332, the pulse temperature sensor 32, and the Bluetooth output module 331 are set at opposite ends of the circuit board 221, so that mutual interference between low-frequency signals and high-frequency signals can be reduced. On the other hand, it can also distinguish the high-frequency signals with high power and high heat from the low-frequency signals, so as to prevent the heat generated by the high-frequency signals from influencing working performances of the power supply 31, the thermistor module 332 and the pulse temperature sensor 32. And then, the coaxial signal wire 223 is provided to transmit two kinds of signals, namely, the charging signals and the Bluetooth RF signals, which can set as few circuits as possible on the basis of solving interference and temperature problems, reduce circuits heating and power consumption. When the temperature detection device 200 is received in the charging device 100, the coaxial signal wire 223 only transmits the charging signal; while, when the temperature detection device 200 is removed from the charging device 100 to detect the temperature of the object to be measured, the coaxial signal wire 223 only transmits the Bluetooth RF signal, which also can save the cost.

Figure 6:
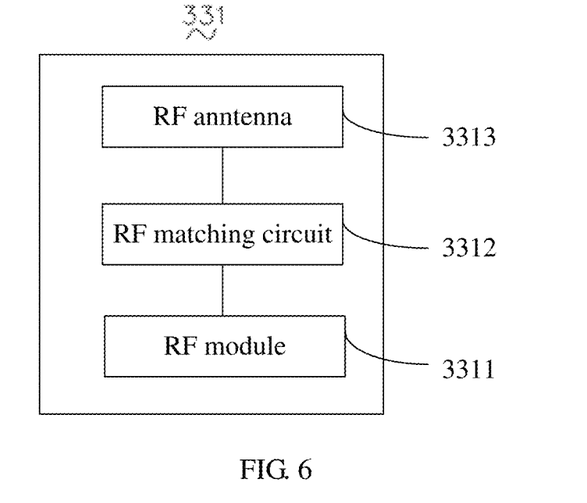
FIG. 6 is a diagram view of a Bluetooth output module of the temperature detection system of FIG. 4.
Figure 7:
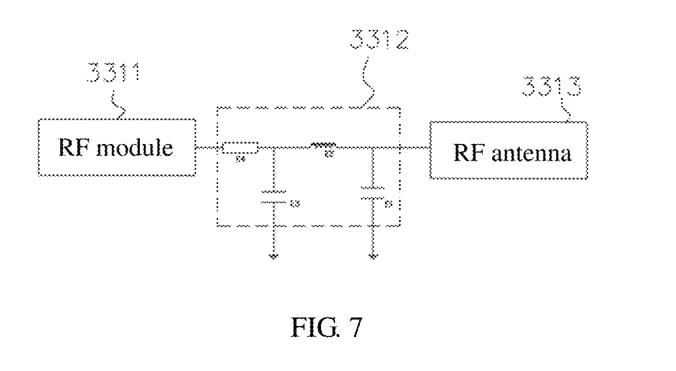
FIG. 7 is a diagram view of a matching network structure of the RF matching circuit of the Bluetooth output module of FIG. 5.

Referring to FIG. 6 and FIG. 7, the Bluetooth output module 331 includes: a RF module 3311, a RF matching circuit 3312 and the RF antenna 3313.

The RF module 3311 is configured to transmit a temperature value signal conforming to a Bluetooth communication protocol according to the final temperature value, the RF matching circuit 3312 is electrically connected between the RF module 3311 and the RF antenna 3313, and configured to perform up-conversion on the temperature value signal of the RF module 3311, and then send the up-conversion temperature value signal to the RF antenna 3313. The RF antenna 3313 is configured to convert the temperature value signal transmitted from the RF matching circuit 3312 into the Bluetooth radio frequency signal with good stability and directivity, and then send out the Bluetooth radio frequency signal in a radio form.

A circuit structure of the RF matching circuit 3312 is shown in FIG. 7. In a preferred embodiment of the present disclosure, component parameters E1~E4 in FIG. 7 are set as shown in Table 1-1 below:

| Component | Parameter value |
|---|---|
| E1 | 0.5 pF |
| E2 | 2NH |
| E3 | 1.5 pF |
| E4 | 0 ohm |

Figure 8:
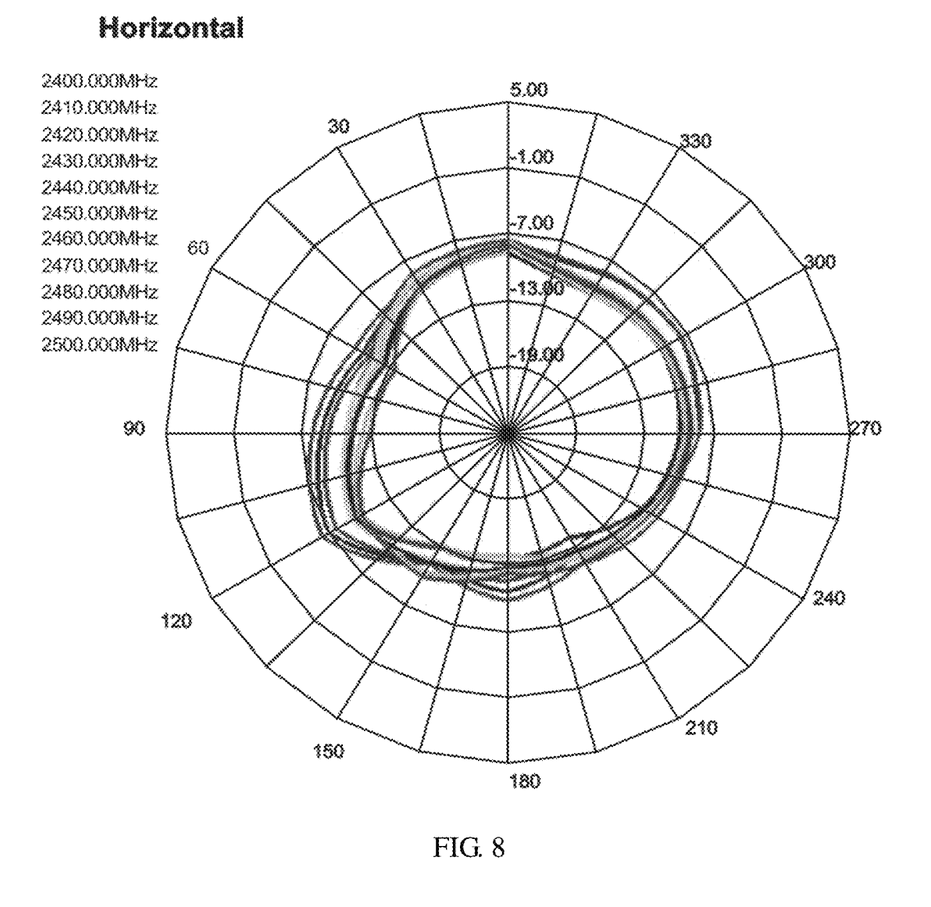
FIG. 8 is a direction detection diagram of the RF antenna using the matching network of FIG. 7.

In the case of setting the above parameters, Bluetooth transmission efficiency and transmission directivity of the wireless signal of the RF antenna 3313 in the present disclosure are tested, which is as shown in table 2-1 and FIG. 8.

| Normal temperature 25° C. | | Simulated environment temperature 120° C. | |
|---|---|---|---|
| frequency (Mhz) | transmission efficiency (%) | frequency (Mhz) | transmission efficiency (%) |
| 2400 | 42.3 | 2400 | 43.5 |
| 2410 | 42.5 | 2410 | 43.6 |
| 2420 | 42.8 | 2420 | 43.7 |
| 2430 | 43.2 | 2430 | 43.5 |
| 2440 | 43.3 | 2440 | 43.4 |
| 2450 | 43.3 | 2450 | 42.8 |
| 2460 | 43.4 | 2460 | 42.6 |
| 2470 | 43.6 | 2470 | 42.2 |
| 2480 | 43.6 | 2480 | 42.1 |
| 2490 | 43.5 | 2490 | 41.8 |
| 2500 | 43.6 | 2500 | 41.6 |

It can be seen from Table 2-1 that, at a normal temperature, the transmission efficiency of the Bluetooth signal with a frequency of 2.4 GHz can be increased slightly with an increase of frequencies, and can reach a maximum transmission efficiency of 43.6%, which can meet requirements of Bluetooth communication. In the case of simulating for food heating (120° C.), test results are shown in the right column of Table 2-1. In this case, with the increase of frequencies, the transmission efficiencies gradually decrease, but can obtain a transmission efficiency of 41.6% at the lowest point, which fully meets the minimum efficiency requirement of the Bluetooth signal transmission. Therefore, the structure and parameter settings of the RF matching circuit 3312 can fully meet the requirements of the temperature detection device 200 that works under a high temperature condition, so as to overcome the problem of a low transmission efficiency of the Bluetooth communication under the high temperature condition in the prior art.

It can be seen from Table 2-1 that, when the temperature is 25° C., the transmission efficiency of the Bluetooth RF signal is between 42.3% and 43.6%; when the temperature is 120° C., the transmission efficiency of the Bluetooth RF signal is between 41.6% and 43.5%. In general, with the increase of temperatures, an output power of the Bluetooth RF signal decreases, which also verifies from another point: 1) the power supply 31, the thermistor module 332 and the pulse temperature sensor 32 arranged on the circuit board 221 near the first portion 211 are remotely isolated from the Bluetooth output module 331 arranged on the circuit board 221 near the second portion 212 through the coaxial signal wire 223, which can prevent the influence of heat generated by the high-frequency signal with high power on the temperature change of the first terminal 211; 2) the temperature of the circuit board 221 can be reduced by setting the heat-resistant metal material 24 and the high temperature resistant gel shell 25 outside the main body 21, in particular, the high temperature resistant gel shell 25 is arranged outside the second portion 212 of the RF antenna 3313, so as to reduce a working temperature of the RF antenna 3313.

Referring to FIG. 8, when the Bluetooth signal has excellent directivity during being transmitted under a frequency of 2.4 GHz, and the transmission efficiency in all directions is basically in a balanced state, which can overcome the problem that the RF antenna 3313 can't be connected because the Bluetooth transmission signal is lost.

Figure 9:
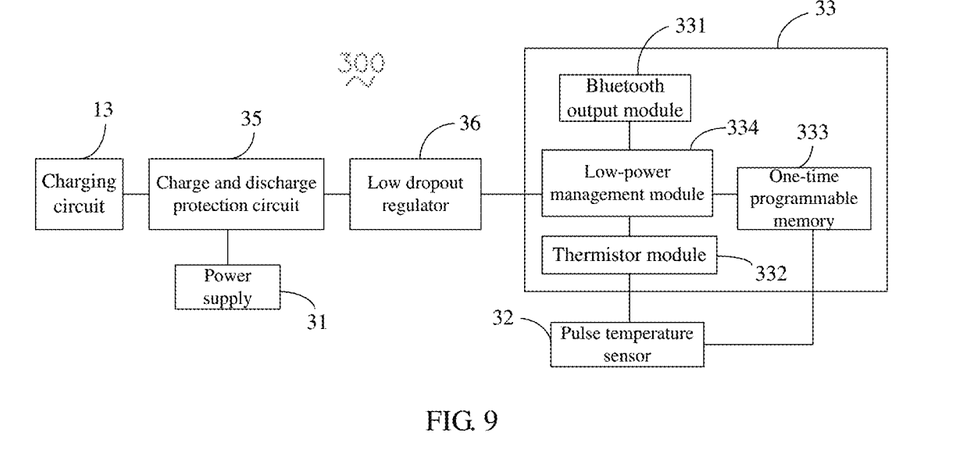
FIG. 9 is a diagram view of the temperature detection system of FIG. 4.

Referring to FIG. 9, the temperature detection system 300 further includes: a charge and discharge protection circuit 35 and a low dropout regulator 36, the charging circuit 13, and the Bluetooth chip 33 including a low-power management circuit 334.

Furthermore, the charging circuit 13 is electrically connected with the power supply 31 and configured to charge the power supply 31. The low dropout regulator 36 is electrically connected between the power supply 31 and the Bluetooth chip 33, and configured to stabilize electrical parameters of the power supply 31 and supply power to the Bluetooth chip 33 and the pulse temperature sensor 32.

The low-power management circuit 334 is electrically connected to the low dropout regulator 36, so that the low dropout regulator 36 can supply power to the Bluetooth chip 33 through the low-power management circuit 334. The low-power management module 334 is configured to control the power supply 31 to supply power to the Bluetooth chip 33, and intelligently control the Bluetooth chip 33 to standby and wake-up, so as to save energy thereof.

Specifically, the low-power management module 334 is adopted a buck-boost circuit, and the low dropout regulator 36 transmits power to the low-power management module 334, and then supplies power to the Bluetooth chip 33 by buck the buck-boost circuit.

A specific working process is as follows:

a first working state: when the low dropout regulator 36 works, that is, the temperature detection device 200 is removed from the charging device 100 and the power supply 31 works, the low dropout regulator 36 is configured to charge an inductance of the buck-boost circuit, discharge a capacitor of the buck-boost circuit, supply power to the Bluetooth chip 33 by using discharge power of the capacitor, and store electric energy in advance by the capacitor of the buck-boost circuit;

a second working state: when the temperature detection device 200 is on standby, that is, when the power supply 31 and the low dropout regulator 36 do not work, the inductor that has been charged with electric energy discharges and supplies power to the capacitor and the Bluetooth chip 33;

at the end of standby of the temperature detection device 200, when the power supply 31 and the low dropout regulator 36 start to work, the capacitor is returned to discharge for supplying power to the Bluetooth chip 33, thereby two working states can be switched to each other.

In an embodiment of the present disclosure, the power stored in the inductor of the buck-boost circuit is much greater than that stored in the capacitor of the buck-boost circuit, so that enough standby time in a standby state can be ensured.

In an embodiment of the present disclosure, the low-power management module 334 can work in two different working states, so that the power supply 31 supplies power to the Bluetooth chip 33 is indirectly controlled.

The charge and discharge protection circuit 35 is electrically connected to both the charging circuit 13 and the power supply 31, and the low dropout regulator 36 is electrically connected between the charge and discharge protection circuit 35 and the Bluetooth chip 33. The charge and discharge protection module 35 is configured to intelligently manage a charging process of the power supply 31 by the charging circuit 13 and indicate a charging state of the power supply 31.

When the charging circuit 13 works and the power supply 31 is charged, the power supply 31 does not supply power to the low dropout regulator 36, at this time, the power supply 31 is in a non-working state relative to the Bluetooth chip 33, the low dropout regulator 36 also does not work, and the buck-boost circuit of the low-power management module 334 works in the first working state. At this time, the charge and discharge protection module 35 receives electric energy of the charge circuit 13 and detects electric quantity of the power supply 31. When the power supply 31 has less power, the charge and discharge protection module 35 outputs a large current to charge the power supply 31; while, when the power supply 31 has a large amount of power and a low charging voltage, the charge and discharge protection module 35 outputs a small current to charge the power supply 31. In this way, the power supply 31 can be quickly charged, and a temperature of the power supply 31 in the charging process can be protected in a reasonable range.

When the charging circuit 13 does not work and the power supply 31 starts to work, the power supply 31 discharges to the charge and discharge protection module 35, the charge and discharge protection module 35 regulates a discharge current of the power supply 31, and outputs the discharge energy to the low dropout regulator 36. And then, the charge and discharge protection module 35 further regulates a voltage and sends the voltage to the buck-boost circuit of the low-power management module 334 for supplying power to the Bluetooth chip 33. At this time, the buck-boost circuit works in the second working state.

The power supply 31 is controlled to be charged by the charge and discharge protection module 35, so that the power supply 31 can be safely charged, and the current can be stably supplied when the power supply 31 supplies power to the low dropout regulator 36.

Figure 10:
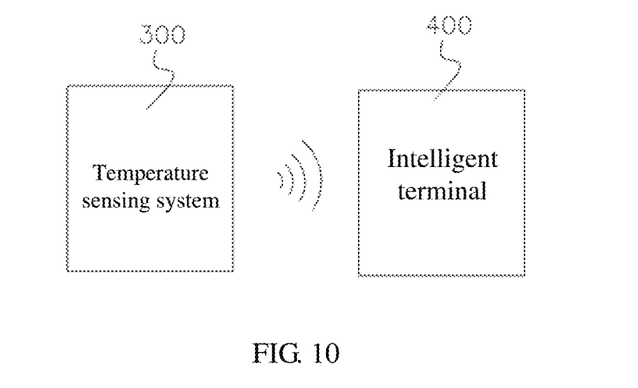
FIG. 10 is a diagram view of the temperature detection system wireless connected to an intelligent terminal of the present disclosure.

Referring to FIG. 10, in the present disclosure, the temperature detection system 300 is further electrically connected to an intelligent terminal 400. The intelligent terminal 400 is communicated with the Bluetooth chi 33 to receive the final temperature value detected by the Bluetooth chip 33.

In the present disclosure, during cooking, the temperature detection device 200 is inserted into the food, and the temperature of the food can be checked in real time through the intelligent terminal 400 so as to provide a cooking guidance.

In another embodiment of the present disclosure, cooking schemes are set in the intelligent terminal 400, and an appropriate cooking scheme can be selected by detecting data such as a temperature and a temperature change rate, so as to realize real-time reminders and obtain better cooking feeling.

In an embodiment of the present disclosure, the Bluetooth chip adopts DA14531 series of Bluetooth chips produced by US Dialog Company.

Figure 11:
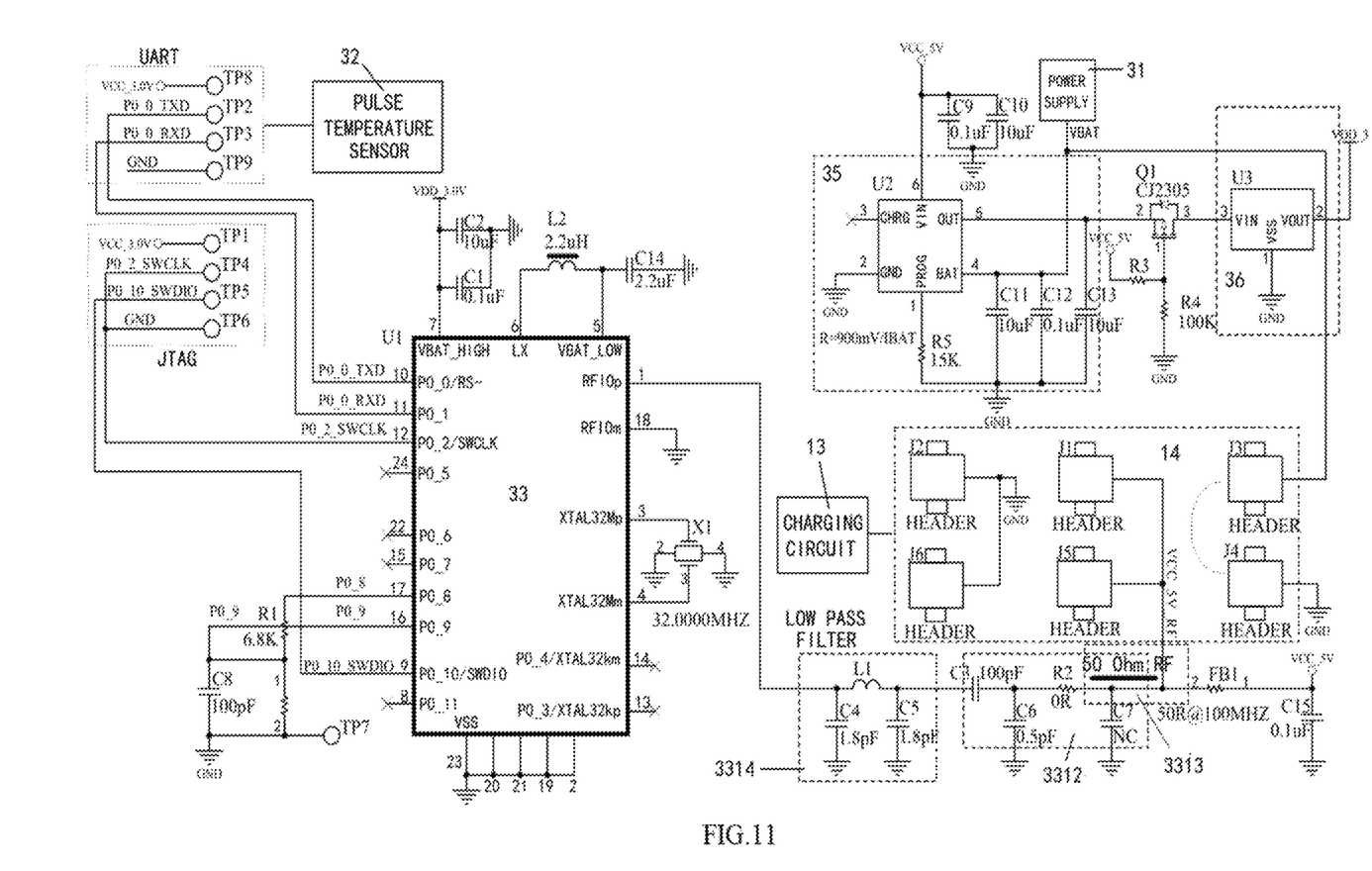
FIG. 11 is a circuit diagram of a Bluetooth chip and peripheral circuits of the present disclosure.

Referring to FIG. 11, a circuit diagram of a peripheral circuit of the Bluetooth chip 33 is shown.

A working process of the peripheral circuit is as follows:

the pulse temperature sensor 32 sends the pulse corresponding to the temperature of the detected object to be measured to the Bluetooth chip 33 through an UART interface, at the same time, the thermistor module 332 also detects the ambient temperature to obtain the first temperature value Temp calculated by the formula (1-1) above mentioned or the second temperature value T calculated by the formula (2-1) above mentioned, and then, the Bluetooth chip 33 calculates the final temperature value according to internal software programs and then sends the final temperature value to the outside by using a RFIOp terminal passing through a low-pass filter 3314, the RF matching circuit 3312 and the RF antenna 3313 in turn. The RFIOp terminal is connected with the Bluetooth output module 331 of the Bluetooth chip 33, and signals sent through the RFIOp terminal is the Bluetooth signals up-converted by the Bluetooth output module 331 and conforms to a Bluetooth communication protocol.

Referring to FIG. 11 and FIG. 3, the charging circuit 13 is placed in the charging device 100, and connected with the temperature detection device 200 through the charging interface 14, and the charging interface 14 is connected to the RF antenna 3313 to provide power for the RF antenna 3313. At the same time, the charging interface 14 is also connected to both the charge and discharge protection circuit 35 and the low dropout regulator 36. Without needing to provide an external power supply to the temperature detection device 200, the power supply 31 generates a voltage of VDD_3V through the low dropout regulator 36 to supply the voltage of VDD_3V to a VBAT_HIGH pin of the Bluetooth chip 33, so as to provide a working voltage for the Bluetooth chip 33, and the VBAT_HIGH pin of the Bluetooth chip 33 is connected with the low-power management module 334 inside the Bluetooth chip 33.

JTAG terminals connected with pins 9, 12 are respectively connected with the one-time programmable (OTP) memory 333, and the software programs are written when the temperature detection device 200 is manufactured and delivered, so that the Bluetooth chip 33 can be configured to be self operation and calculate the final temperature value according to the software programs.

An element FB1 shown in FIG. 11 is the isolation magnetic bead 224, the isolation magnetic bead 224 isolates the RF antenna 3313 that is arranged on the left of the isolation magnetic bead 224, from all of an input voltage VCC_5V of the power supply 31, the charging interface 14, and the charging circuit 13 that are arranged on the right of the isolation magnetic bead 224, which can reduce the power consumption of the temperature detection device 200 by sharing the coaxial signal wire 23 to isolate transmission signals therebetween.

As shown in FIG. 11, a CMOS tube (model: CJ2305) of a level control switch Q1 is configured to detect a charging status and a discharging status of the charge and discharge protection module 35 to automatically switch the low dropout regulator 36, so that the temperature detection device 200 can be reset rather than needing any switches. Once the power supply 31 is completely charged, the temperature sensing device 200 is removed from the charging structure 100, the level control switch Q1 is turned on, and the low dropout regulator 36 starts to work so as to provide power for the Bluetooth chip 33, that is, the low dropout regulator 36 supplies power to the VBAT_HIGH pin to start the temperature detection system 300.

It can be seen from FIG. 11, that the software programs stored in the one-time programmable (OTP) memory 333 is also configured to troubleshoot and quick restart of the Bluetooth chip 33.

Furthermore, the troubleshoot refers that the Bluetooth chip 33 fails to work normally, such as: no Bluetooth signals, no Bluetooth connections, no temperature values detected, abnormal temperature detections and other unknown abnormal conditions for unknown reasons. The temperature detection device 200 is placed in the charging device 100 to be charged, and then the temperature detection device 200 is removed from the charging device 100 to detect a temperature of the objected to be measured by inserting into the object, the power supply 31 supplies power to the charge and discharge protection circuit 35, and the charge and discharge protection circuit 35 outputs a control signal to the level control switch Q1, and the level control switch Q1 is on. The low-power management module 334 works in the first working state via the buck-boost circuit therein. After that, the Bluetooth chip 33 automatically starts to work under the drive of the low dropout regulator 36, the software programs run in the Bluetooth chip 33 again, and the Bluetooth chip 33 will restart and calculate the final temperature value without manual maintenance and repair.

Figure 12:
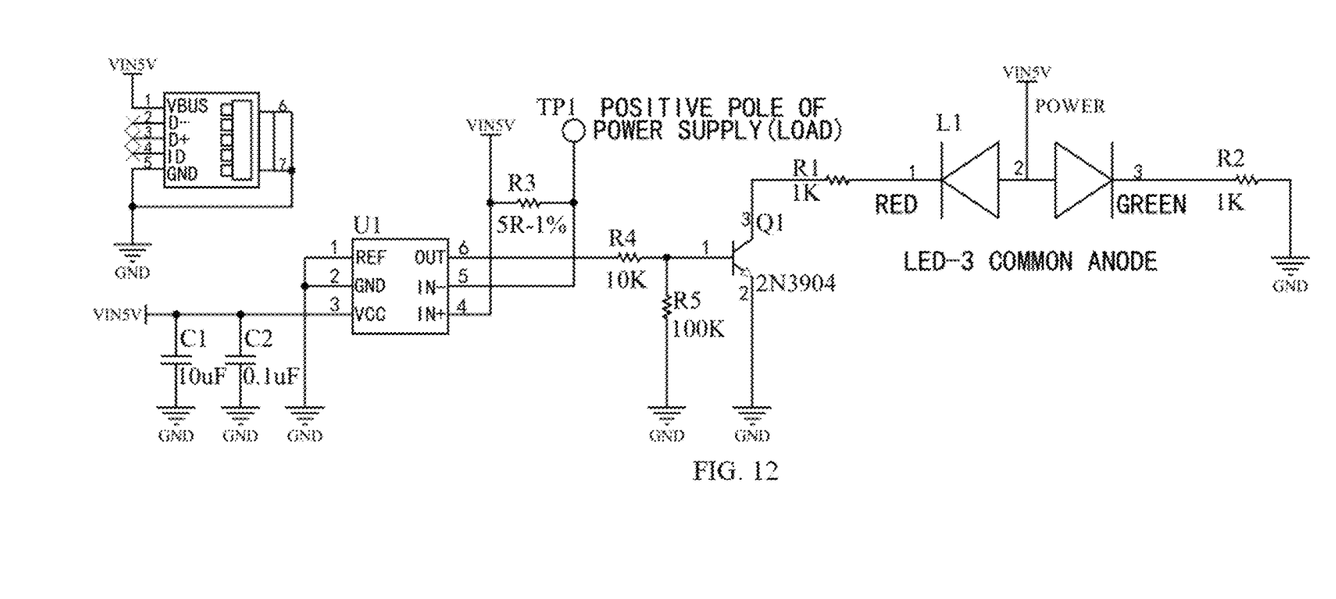
FIG. 12 is a circuit diagram of a charging circuit of the present disclosure.

Referring to FIG. 12, a circuit diagram of the charging circuit 13 is provided. As shown in FIG. 12, a chip U1 can obtain electric signals of 100 times voltage of VIN+ and VIN−, by using a voltage amplifier with 100 times precision to amplify a voltage of an output terminal OUT, an output current of the output terminal OUT is 3 MA, at this time, a voltage of 0.015 v is obtained by a resistance R3, and then the voltage of 0.015 v is amplified 100 times to obtain a voltage of 1.5V, so that a triode Q1 (model: 2N3904) is on. A red light of a diode L1 with a common anode is on, which indicates that the temperature detection device 200 is in a charging state. When the resistor R3 is fully charged, the current is 0.0002 MA, the voltage is 0.1V, the triode Q1 is in a cut-off state, and the red light of the diode L1 with the common anode is off, which indicates that the temperature detection device 200 is in a charging complete state. The charging electric energy is connected to the second terminal 232 of the temperature detection device 200 through an interface TP1 to charge the temperature detection device 200.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A temperature detection system comprising:
a power supply configured to supply power to the temperature detection system;
a pulse temperature sensor configured to detect a temperature of an object to be measured by inserting into the object to be measured, and output detection pulses;
a Bluetooth chip electrically connected to the power supply and the pulse temperature sensor, and configured to receive the detection pulses transmitted from the pulse temperature sensor and calculate number of the detection pulses per unit time, the Bluetooth chip comprising:
a negative temperature coefficient (NTC) thermistor module configured to detect an ambient temperature of the object to be measured to obtain an intermediate temperature value;
a one-time programmable (OTP) memory configured to store software programs in the Bluetooth chip, and the Bluetooth chip configured to determine a final temperature value according to the intermediate temperature value and the number of detection pulses per unit time by performing the software programs;
a Bluetooth output module configured to convert the detected final temperature value into Bluetooth radio frequency (RF) signals and then output the Bluetooth radio frequency signals; and wherein
the final temperature value is obtained through the followings:
calculating a first temperature value through formula (1-1) according to the number of the detection pulses per unit time sent from the pulse temperature sensor;

$$\text{Temp}=\text{Num}*0.0625° \text{ C.} -50.0625° \text{ C.} \qquad (1\text{-}1);$$

wherein, Num represents the number of the detection pulses, Temp represents the first temperature value; and
comparing the first temperature value with the intermediate temperature value, to take a larger one from the first temperature value and the intermediate temperature value as the final temperature value;
wherein the temperature detection system further comprises:
a low dropout regulator (LDO) electrically connected between the power supply and the Bluetooth chip, and configured to stabilize electrical parameters of the power supply and supply power to the Bluetooth chip and the pulse temperature sensor.

2. The temperature detection system as claimed in claim 1, wherein the Bluetooth output module comprises:
a radio frequency (RF) module configured to transmit a temperature value signal conforming to a Bluetooth communication protocol according to the final temperature value;
a radio frequency (RF) antenna; and
a radio frequency (RF) matching circuit electrically connected between the RF module and the RF antenna, and configured to perform up-conversion on the temperature value signal of the RF module, and then send the up-conversion temperature value signal to the RF antenna; and the RF antenna configured to convert the temperature value signal transmitted from the RF matching circuit into a Bluetooth radio frequency signal with good stability and directivity, and then send out the Bluetooth radio frequency signal in a radio form.

3. The temperature detection system as claimed in claim 1, wherein the final temperature value is calculated by the following correction process:

calculating a second temperature value through formula (2-1) according to the number of the detection pulses per unit time sent from the pulse temperature sensor;

$$T=\text{Temp}+(\text{Temp}-30)*0.005, \text{Temp}<30°\text{ C.};$$

$$T=\text{Temp}, 30°\text{ C.} \leq \text{Temp}<100°\text{ C.};$$

$$T=\text{Temp}+(100-\text{Temp})*0.012, 100°\text{ C.} \leq \text{Temp}<150°\text{ C.}; \quad (2\text{-}1)$$

wherein, T represents the second temperature value, Temp represents the first temperature value; and comparing the second temperature value with the intermediate temperature value, to take a larger one from the second temperature value and the intermediate temperature value as the final temperature value.

4. The temperature detection system as claimed in claim 1, wherein the Bluetooth chip comprises a low-power management module configured to control the power supply to supply power to the Bluetooth chip.

5. The temperature detection system as claimed in claim 4, wherein the temperature detection system further comprises:

a charging circuit electrically connected with the power supply and configured to charge the power supply.

6. The temperature detection system as claimed in claim 5, wherein the temperature detection system further comprises a charge and discharge protection circuit electrically connected with the charging circuit and the power supply, the low dropout regulator electrically connected between the charge and discharge protection circuit and the Bluetooth chip, the charge and discharge protection circuit configured to intelligently manage the charging circuit to charge the power supply and indicate a charging state of the power supply.

7. The temperature detection system as claimed in claim 1, wherein the Bluetooth chip adopts DA14531 series of Bluetooth chips produced by US Dialog Company.

8. The temperature detection system as claimed in claim 1, wherein the temperature detection system is further electrically connected to an intelligent terminal, the intelligent terminal communicated with the Bluetooth chip to receive the final temperature value detected by the Bluetooth chip.

9. A temperature detection device comprising:

a temperature detection system comprising a charging circuit and configured to detect a final temperature value of an object to be measured;

a long-strip shaped main body comprising a first portion and a second portion opposite to the first portion, the first portion configured to detect a temperature of the object to be measured by inserting into the object to be measured, and the second portion exposed outside the object to be measured and sending out the final temperature value detected by the temperature detection system;

a circuit structure arranged in the main body, and carrying the temperature detection system thereon;

a pair of charging terminals respectively arranged in the main body, extending out of the main body, and electrically connected to the charging circuit; and wherein the temperature detection system comprises:

a power supply configured to supply power to the temperature detection system;

a pulse temperature sensor configured to detect the temperature of the object to be measured by inserting into the object to be measured, and output detection pulses;

a Bluetooth chip electrically connected to the power supply and the pulse temperature sensor and configured to receive the detection pulses transmitted from the pulse temperature sensor and calculate number of the detection pulses per unit time, the Bluetooth chip comprising:

a negative temperature coefficient (NTC) thermistor module configured to detect an ambient temperature of the object to be measured to obtain an intermediate temperature value;

a one-time programmable (OTP) memory configured to store software programs in the Bluetooth chip, and the Bluetooth chip configured to determine the final temperature value according to the intermediate temperature value and the number of the detection pulses per unit time by performing the software programs;

a Bluetooth output module configured to convert the detected final temperature value into Bluetooth radio frequency (RF) signals and then output the Bluetooth radio frequency signals; and wherein the final temperature value is obtained through the followings:

calculating a first temperature value through formula (1-1) according to the number of the detection pulses per unit time sent from the pulse temperature sensor;

$$\text{Temp}=\text{Num}*0.0625°\text{ C.}-50.0625°\text{ C.} \quad (1\text{-}1);$$

wherein, Num represents the number of the detection pulses, Temp represents the first temperature value; and comparing the first temperature value with the intermediate temperature value, to take a larger one from the first temperature value and the intermediate temperature value as the final temperature value;

wherein the Bluetooth chip is arranged on the circuit board, near the first portion, and electrically connected with the coaxial signal wire of the circuit board; the coaxial signal wire comprising an isolation magnetic bead configured to isolate the Bluetooth radio frequency signals on the coaxial signal wire from charging signals output from the charging circuit, so that the charging signals and the Bluetooth radio frequency signals share with the same channel.

10. The temperature detection device as claimed in claim 9, wherein the pair of charging terminals comprises a first terminal comprising two metal contacts respectively arranged on both sides of the main body along a transverse direction of the main body, and a second terminal arranged on an end of the second portion.

11. The temperature detection device as claimed in claim 10, wherein the circuit structure comprises:

a circuit board that the power supply, the thermistor module and the pulse temperature sensor are respectively arranged on the circuit board and near the first portion;

the Bluetooth output module arranged on the circuit board and near the second portion, and electrically connected to the second terminal; a radio frequency (RF) antenna of the Bluetooth output module electrically connected with the first terminal through a coaxial signal wire of the circuit board, and the power supply electrically connected between the first terminal and the second terminal.

12. The temperature detection device as claimed in claim 9, wherein each of each of the pair of charging terminals is a telescopic thimble structure.

13. The temperature detection device as claimed in claim 9, wherein the main body is made of antibacterial and heat-resistant metal material.

14. The temperature detection device as claimed in claim 9, wherein a high temperature resistant gel shell sleeves around the second portion, and the pair of charging terminals extends out of the gel shell.

15. A charging device configured to charge a temperature detection device, the temperature detection device comprising:
- a temperature detection system configured to detect a final temperature value of an object to be measured;
- a long-strip shaped main body comprising a first portion and a second portion opposite to the first portion, the first portion configured to detect a temperature of the object to be measured by inserting into the object to be measured, and the second portion exposed outside the object to be measured and sending out the final temperature value detected by the temperature detection system;
- a circuit structure arranged in the main body, and carrying the temperature detection system thereon;
- a pair of charging terminals respectively arranged in the main body, extending out of the main body, and electrically connected to the charging circuit; and wherein the temperature detection system comprises:
- a power supply configured to supply power to the temperature detection system;
- a pulse temperature sensor configured to detect a temperature of the object to be measured by inserting into the object to be measured, and output detection pulses;
- a Bluetooth chip electrically connected to the power supply and the pulse temperature sensor, and configured to receive the detection pulses transmitted from the pulse temperature sensor and calculate number of the detection pulses per unit time, the Bluetooth chip comprising:
- a negative temperature coefficient (NTC) thermistor module configured to detect an ambient temperature of the object to be measured to obtain an intermediate temperature value;

- a one-time programmable (OTP) memory configured to store software programs in the Bluetooth chip, and the Bluetooth chip configured to determine the final temperature value according to the intermediate temperature value and the number of the detection pulses per unit time by performing the software programs;
- a Bluetooth output module configured to convert the detected final temperature value into Bluetooth radio frequency (RF) signals and then output the Bluetooth radio frequency signals; and wherein the final temperature value is obtained through the followings:

calculating a first temperature value through formula (1-1) according to the number of the detection pulses per unit time sent from the pulse temperature sensor;

$$\text{Temp}=\text{Num}*0.0625° \text{ C.}-50.0625° \text{ C.} \quad (1\text{-}1);$$

wherein, Num represents the number of the detection pulses, Temp represents the first temperature value; and comparing the first temperature value with the intermediate temperature value, to take a larger one from the first temperature value and the intermediate temperature value as the final temperature value; and wherein the charging device comprises:
- a charging chamber;
- a receiving room arranged in the charging chamber for receiving the temperature detection device therein, a pair of charging contacts arranged on a side wall of the receiving room to electrically connect with the pair of charging terminals, respectively;
- a charging circuit arranged in the charging chamber so that the pair of charging contacts is electrically connected with the pair of charging terminals through the charging circuit to charge the temperature detection device;

wherein the temperature detection system further comprises:
- a low dropout regulator (LDO) electrically connected between the power supply and the Bluetooth chip, and configured to stabilize electrical parameters of the power supply and supply power to the Bluetooth chip and the pulse temperature sensor.

16. The charging device as claimed in claim 15, wherein the charging circuit comprises a charging interface arranged at one end of the charging chamber, and an indicating light located on the charging chamber for indicating a charging state of the temperature detection device.

* * * * *